US012452593B2

(12) United States Patent
Otsuka

(10) Patent No.: US 12,452,593 B2
(45) Date of Patent: Oct. 21, 2025

(54) SOUND OUTPUT DEVICE

(71) Applicant: DENSO CORPORATION, Kariya (JP)

(72) Inventor: Manabu Otsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 18/067,542

(22) Filed: Dec. 16, 2022

(65) Prior Publication Data

US 2023/0199389 A1 Jun. 22, 2023

(30) Foreign Application Priority Data

Dec. 21, 2021 (JP) ................................ 2021-207403

(51) Int. Cl.
*H04R 3/04* (2006.01)
*G10K 15/08* (2006.01)
*H04R 1/02* (2006.01)

(52) U.S. Cl.
CPC .............. *H04R 3/04* (2013.01); *G10K 15/08* (2013.01); *H04R 1/025* (2013.01); *H04R 2430/01* (2013.01); *H04R 2499/13* (2013.01)

(58) Field of Classification Search
CPC ...... H04R 3/04; H04R 1/025; H04R 2430/01; H04R 2499/13; G10K 15/08
See application file for complete search history.

(56) References Cited

U.S. PATENT DOCUMENTS 6,360,187 B1 * 3/2002 Hermann ................ H03G 3/32 702/191
2005/0128106 A1 6/2005 Nakaishi et al.
2008/0071400 A1 * 3/2008 Haulick .................. H04S 7/302 700/94
2014/0195143 A1 * 7/2014 Kandangath ....... G01C 21/3629 701/400
2015/0285641 A1 * 10/2015 Nielsen .................. G10L 13/00 381/302
2016/0345115 A1 * 11/2016 Paik .......................... H04S 7/30
2017/0055078 A1 * 2/2017 Christoph .............. H04R 1/025
2018/0216953 A1 * 8/2018 Suenaga ................ H04S 5/005
2022/0382509 A1 * 12/2022 Filos ....................... G06F 3/165

FOREIGN PATENT DOCUMENTS

JP H8-110237 A 4/1996
JP 2003-156352 A 5/2003
JP 2006-50083 A 2/2006
JP 2007-019980 A 1/2007
JP 2007-271307 A 10/2007
JP 2021-67642 A 4/2021
WO 2007/032389 A1 3/2007

* cited by examiner

*Primary Examiner* — Daniel R Sellers
(74) *Attorney, Agent, or Firm* — Maschoff Brennan

(57) ABSTRACT

A sound output device includes an acquisition unit, an ear speaker, and a sound controller. The acquisition unit acquires data of an information sound providing an operator with information. The ear speaker outputs the information sound such that sound pressure of the information sound at a position of an ear of the operator is higher than sound pressure at positions other than the position of the ear. The sound controller controls the ear speaker to emphasize the information sound more when the information sound indicates a high degree of necessity for the operator to take action against the information sound than when the information sound indicates a low degree of the necessity.

10 Claims, 3 Drawing Sheets

| IMMEDIATE-RESPONSE NECESSITY | Tout[s] | rc | rs |
|---|---|---|---|
| FORTH LEVEL | 0 | 0 | 0 |
| THIRD LEVEL | 0.2 | 0.5 | 0 |
| SECOND LEVEL | 0.5-1.0 | 0.5 | 0 |
| FIRST LEVEL | 1.0-2.0 | 0.5 | 0.1 |

| TRAVELING SPEED | NOISE LEVEL | fcg | rg |
|---|---|---|---|
| 0-50km/h | LOW | 4kHz | 3dB |
| 50-80km/h | MIDDLE | 3kHz | 4dB |
| ABOVE 80km/h | HIGH | 2kHz | 6dB |

SOUND OUTPUT DEVICE

CROSS REFERENCE TO RELATED APPLICATION

The present application is a continuation application of Japanese Patent Application No. 2021-207403 filed on Dec. 21, 2021. The entire disclosure of the above application is incorporated herein by reference.

TECHNICAL FIELD

The disclosure in this specification relates to a sound output device that outputs information sound for an operator.

BACKGROUND

A navigation device has been realized, which registers a planned route of a vehicle and provides route guidance by voice.

SUMMARY

According to at least one embodiment, a sound output device according to the present disclosure includes an acquisition unit, an ear speaker, and a sound controller. The acquisition unit acquires data of an information sound providing an operator with information. The ear speaker outputs the information sound such that sound pressure of the information sound at a position of an ear of the operator is higher than sound pressure at positions other than the position of the ear. The sound controller controls the ear speaker to emphasize the information sound more when the information sound indicates a high degree of necessity for the operator to take action against the information sound than when the information sound indicates a low degree of the necessity.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
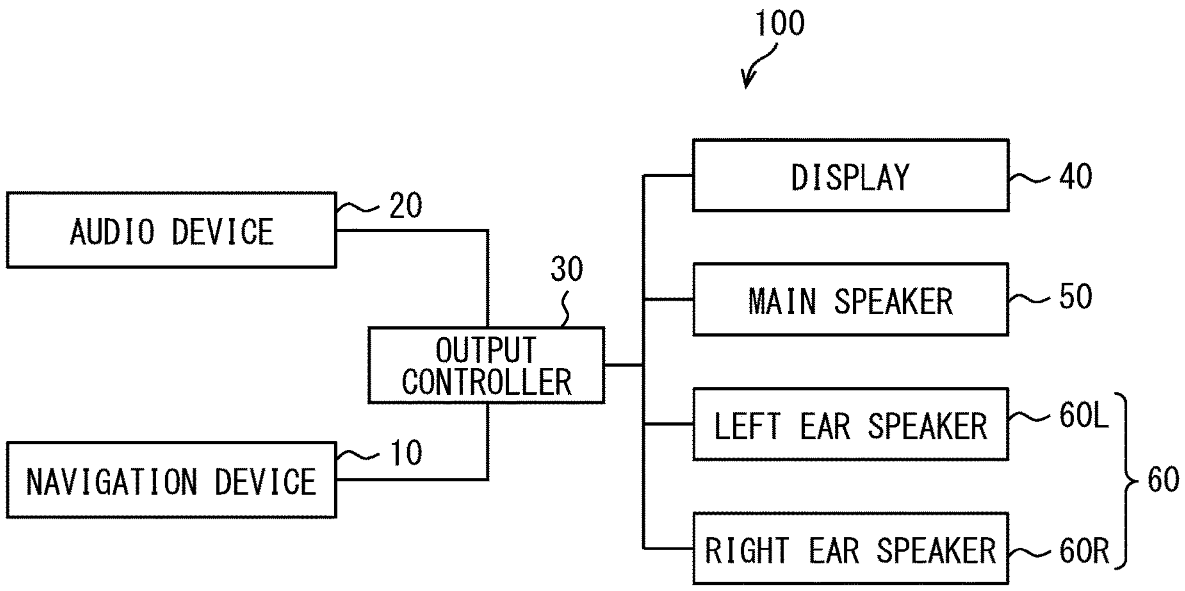
FIG. 1 is a block diagram illustrating a configuration of the in-vehicle system 100.

To begin with, examples of relevant techniques will be described.

A navigation device has been realized, which registers a planned route of a vehicle and provides route guidance by voice. This navigation device determines intersections where the vehicle has to turn left or right based on the planned route, map information, and a current position, and notifies a driver of the intersections in advance so that the vehicle can travel along the planned route.

When performing the route guidance, the navigation device uses displaying of a map screen and outputting of a guide voice. Since it is not preferable to let the driver gaze at the map screen while driving the vehicle, the notification by the guide voice is important. On the other hand, if the vehicle has an audio device that outputs music and video, the driver may be difficult to distinguish between the music output by the audio device and the guide voice.

Therefore, when a driving assistance device according to a comparative example outputs the guide voice, the driving assistance device reduces a volume of music output from an audio device or reduces a volume of voice of a singer included in the music.

In the driving assistance device, the volume of the audio device is reduced to make it easier to hear the guide voice. However, in a case where a guide voice such as a warning sound indicates a high level of urgency, or a case where a guide voice indicates a high degree of necessity for the driver to take immediate action, an ease of hearing the guide voice may be desired to be more improved.

In contrast to the comparative example, according to a sound output device of the present disclosure, an information sound indicating a high degree of necessity for an operator to take action can be outputted while an ease of hearing the information sound is improved.

According to one aspect of the present disclosure, a sound output device includes an acquisition unit, an ear speaker, and a sound controller. The acquisition unit acquires data of an information sound providing an operator with information. The ear speaker outputs the information sound such that sound pressure of the information sound at a position of an ear of the operator is higher than sound pressure at positions other than the position of the ear. The sound controller controls the ear speaker to emphasize the information sound more when the information sound indicates a high degree of necessity for the operator to take action against the information sound than when the information sound indicates a low degree of the necessity.

In the sound output device, since the ear speaker outputs the information sound such that the sound pressure at the position of the operator's ear is higher than at the other positions, the operator feels such that the ear speaker outputs the information sound in the operator's ear. When the information sound is output in the operator's ear, the information sound has a stronger psychological effect on the operator than when the information sound is output at a place away from the operator, and the operator can hear the information sound more easily. Also, when the degree of the necessity is high, the information sound is emphasized so that the operator can hear the information sound more easily than when the degree of the necessity is low. As a result, the sound output device is capable of outputting the information sound indicating the high degree of the necessity for the operator to take action while the operator can hear more easily the information sound.

First Embodiment

Hereinafter, a first embodiment of the present disclosure will be described with reference to FIGS. 1 to 5. An in-vehicle system 100 of the present embodiment is installed in a vehicle. The in-vehicle system 100 includes a navigation device 10, an audio device 20, an output controller 30, a display 40, a main speaker 50 and an ear speaker 60, as shown in FIG. 1. The main speaker 50 and the ear speaker 60 are parts that output sounds, and the output controller 30 controls each of the main speaker 50 and the ear speaker 60. Therefore, a sound output device includes the output controller 30, the main speaker 50 and the ear speaker 60.

The navigation device 10 is a device that sets a planned route for the vehicle and guides a driver along the planned route. Although not shown, the navigation device 10 includes a global navigation satellite system receiver (i.e., GNSS receiver), a map data storage unit, and a navigation controller.

The GNSS receiver receives positioning signals from artificial satellites. Artificial satellites are also called positioning satellites. The GNSS receiver outputs received positioning signals as GPS information to the navigation controller.

The map data storage unit stores map data. The map data storage unit is connected to the navigation controller, and the navigation controller is capable of reading the map data from the map data storage unit. The map data defines a map on which roads are expressed by links and nodes. More specifically, in the map data, each link is a segment having a predetermined length along a road, and the links are sequentially connected via the nodes.

For example, the map data storage unit may be provided by a cloud server instead of a storage included in the navigation device 10. The cloud server may transmit the map data to the navigation device 10 in order to achieve the function of the map data storage unit.

The navigation controller determines a self-position of the vehicle based on the GPS information. The navigation controller also sets the planned route based on the determined self-position, a set target position, and map data, and performs route guidance.

The route guidance is provided to the driver through an image of the planned route and a guide sound. The guide sound is a sound that guides the driver along the planned route, and includes a sound effect and a voice. More specifically, the navigation controller detects a place where the navigation controller should give guidance to the driver, such as an intersection where the vehicle has to turn left or right, based on the planned route and the self-position. The navigation controller executes a guidance process when the vehicle is approaching the place where the navigation controller should give the guidance to the driver. The guidance process includes a process of outputting a guide sound, and a process of enlarging a display of an intersection.

The navigation controller creates a display data by performing the guidance process, and then outputs the display data to the output controller 30. The display data indicates contents to be notified to the driver via displaying thereof. The display data is, for example, a map showing an intersection and its surroundings where the vehicle has to turn left or right, and a turning direction of the vehicle. The navigation controller also creates sound data, and then outputs the sound data to the output controller 30. The sound data indicates contents to be notified to the driver, for example, a distance to an intersection where the vehicle has to turn left or right, and a travel direction of the vehicle.

The audio device 20 is a device that provides passengers with various contents such as music and video. The audio device 20 has, for example, a drive section, a tuner section and an audio controller inside.

The drive section reads music information and video information from storage media such as a compact disc (i.e., CD), a digital versatile disc (i.e., DVD), and a hard disk drive (i.e., HDD), and outputs the information to the audio controller. The tuner section receives a radio broadcast and a television broadcast, and outputs them to the audio controller. The contents may also be obtained via a network such as the Internet.

The audio controller performs various processes on the contents read by the drive section or received by the tuner section, and outputs the processed contents to the output controller 30. The audio controller performs a surround process on sound information when the sound information of the contents is a stereo sound source. Data of the stereo sound source is created on the premise that a sound output from two speakers: a left speaker and a right speaker. Therefore, the data of the stereo sound source includes data to be output from the right speaker and data to be output from the left speaker. By changing differences between left and right output sounds, listener can feel that an origin of an output sound changes in direction and distance.

The surround process includes calculating a virtual output from a particular direction, such as a virtual output from a center position between the right and left speakers, based on the data of the stereo sound source, and adjusting sounds outputted from the respective speakers such that the listener can feel that a sound comes form the particular direction.

The audio controller also performs a process of playing back the sound information when the sound information of the contents is a 5.1 ch sound source. Data of the 5.1 ch sound source is created on the premise that sounds are output from six speakers that includes five speakers in front, front-right, front-left, rear-right, and rear-left of the listener, and another for bass output. Therefore, the data of the 5.1 ch sound source includes data for outputting from each direction.

A dedicated speaker for each direction of the 5.1 ch sound source cannot be provided in some cases. For example, when a center speaker is not provided in front of the listener, a center output that should be output from the center speaker is split and allocated to other speakers, for example, a right-front speaker in right-front of the listener and a left-front speaker in left-front of the listener. Then, center components of outputs from these speakers are added to realize the center output virtually.

The output controller 30 executes a program stored in a storage medium and controls the display 40 and speakers 50, 60. The output controller 30 includes at least one calculation processing device (i.e., CPU) and the storage medium for storing a program and data. The output controller 30 is provided by a microcontroller including a computer-readable storage medium. The storage medium is a non-transitional substantive storage medium that stores computer-readable programs and data non-temporarily. The storage medium is realized by a semiconductor memory, a magnetic disk, or the like.

The output controller 30 processes output data from the navigation device 10 and the audio device 20 as necessary. The output controller 30 outputs the processed data from the display 40 and the speakers 50, 60. The output controller 30 adds various special effects to the output sound, for example, to improve sound quality and realism as output processes. The special effects are, for example, an emphasis process that is a process of emphasizing the output sound within a predetermined band, and a reverberation addition process that is a process of adding reverberation to the output sound.

The display 40 notifies the driver of the contents by displaying an image. The image displayed on the display 40 is controlled by the output controller 30. The display 40 is provided in a vehicle compartment at a position where a driver can visually recognize the display 40, for example, on an instrument panel. The display 40 is realized by, for example, a center information display.

The main speaker 50 is an audio speaker and outputs a sound of the contents, that is, an audio sound. The sound output from the main speaker 50 is controlled by the output controller 30. The main speaker 50 is arranged farther from the driver's seat than the ear speaker 60. The main speaker 50 is integrated with the display 40, for example.

The ear speaker 60 outputs the information sound such that sound pressure of the information sound at a position of the driver's ear is higher than at positions other than the position of the driver's ear. The driver is an example of an operator. The information sound is different form the audio sound, and provides the driver with information related to a driving operation of the vehicle. The information sound includes, for example, a guide sound for route guidance, a warning sound for warning, a beep sound for notification of abnormality, or a sound for an earthquake early warning.

The ear speaker 60 outputs a sound at a higher sound pressure at the driver's ears than at the driver's waist when the driver seated on the driver's seat, for example. Also, the ear speaker 60 outputs a sound at a higher sound pressure at a position of the ears of the driver sitting on the driver's seat than at a position where the main speaker 50 is installed. The ear speaker 60 may be arranged to be closer to the ears of the driver than to elbows of the driver seated on the driver's seat.

In the present embodiment, the ear speaker 60 is arranged in a headrest of a driver's seat of the vehicle or at a position around the headrest. The position around the headrest is between a center of a backrest of the driver's seat in a vertical direction and the headrest, for example, at an upper end of the backrest.

Therefore, the ear speaker 60 is arranged at a position closer to the ears of the driver seated on the driver's seat than to the main speaker 50. Further, in the present embodiment, the ear speaker 60 is one of two ear speakers. One ear speaker 60 is for a left ear of the driver, and the other ear speaker 60 is for a right ear of the driver. The ear speaker 60 for the driver's left ear is a left ear speaker 60L, and is arranged leftward of the driver's seat. The ear speaker 60 for the driver's right ear is a right ear speaker 60R, and is arranged rightward of the driver's seat. As a result, the left ear speaker 60L is arranged to be closer to the left ear of the driver than the right ear speaker 60R is. Similarly, the right ear speaker 60R is arranged to be closer to the right ear of the driver than the left ear speaker 60L is.

Figure 2:
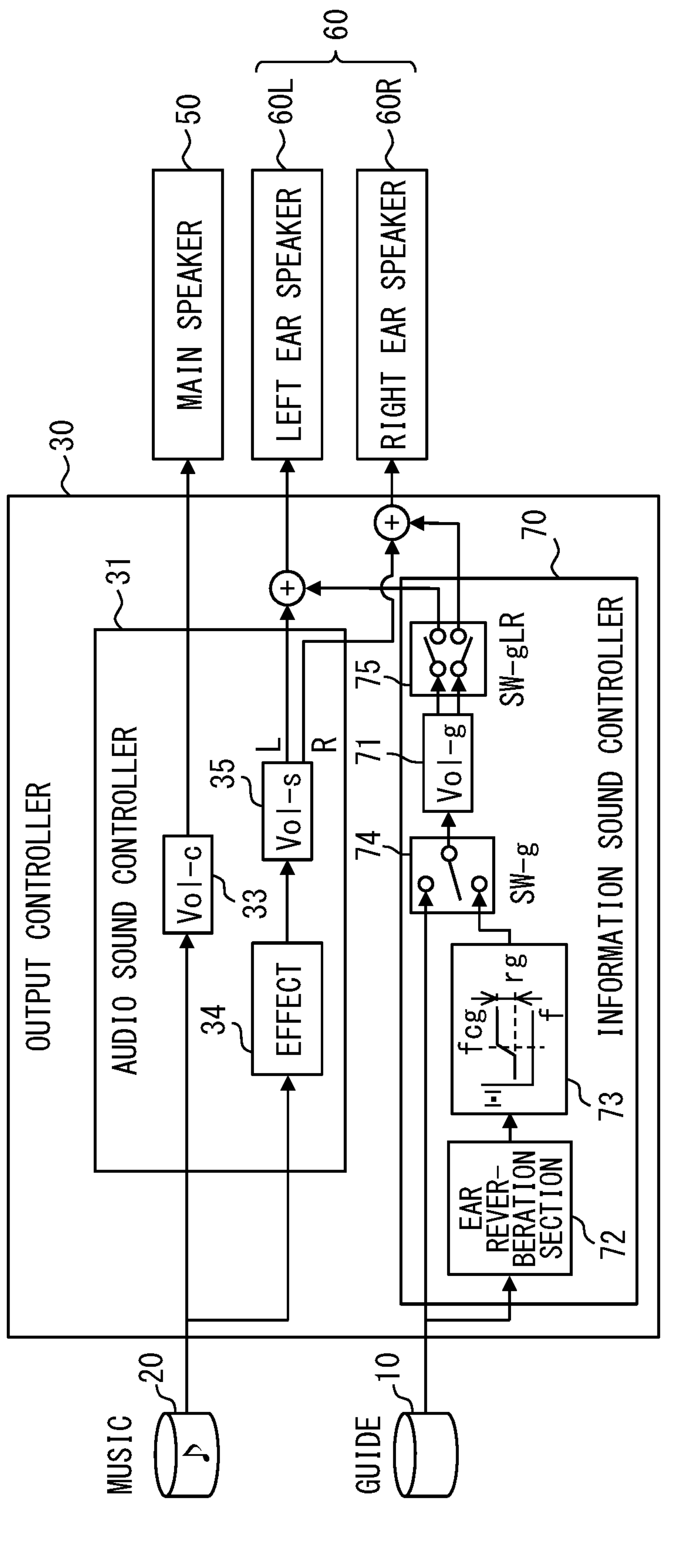
FIG. 2 is a block diagram specifically illustrating a configuration of an output controller 30.

Next, the output controller 30 will be described in more detail with reference to FIG. 2. As shown in FIG. 2, the output controller 30 has an audio sound controller 31 and an information sound controller 70 as functional blocks.

The audio sound controller 31 acquires the sound information of the contents, i.e., the audio sound from the audio device 20, processes the sound information for output control, and outputs the processed data to the main speaker 50 and the ear speaker 60. The audio sound controller 31 includes a main volume controller 33, a first ear special effect section 34, and a first ear volume controller 35. The main volume controller 33 adjusts a volume of the audio sound outputted from the main speaker 50. The first ear special effect section 34 controls special effects to be applied to the audio sound outputted from the ear speaker 60. As described above, the special effects are, for example, the emphasis process within the predetermined band, and the reverberation addition process. The first ear volume controller 35 adjusts a volume of the audio sound controlled by the first ear special effect section 34.

The information sound controller 70 acquires the sound information, i.e., the information sound from the navigation device 10, processes the information sound for output control, and outputs the processed data to the ear speaker 60. Therefore, the information sound controller 70 also functions as an acquisition unit.

The information sound controller 70 includes a second ear volume controller 71, an ear reverberation section 72, an ear emphasis section 73, a first switch 74 and a second switch 75. The ear reverberation section 72 performs the reverberation addition process for adding a reverberation to the information sound. The reverberation addition process is capable of changing a degree of addition of the reverberation. Thus, the higher the degree of addition, the longer the reverberation. For the reverberation addition process, for example, a so-called comb filter or so-called Schroeder's reverberation may be used. The ear emphasis section 73 performs a signal process that is a process emphasizing a high-frequency component of the information sound that has been processed in the reverberation addition process by the ear reverberation section 72. For example, the ear emphasis section 73 emphasizes the volume of the information sound by 6 dB in a high frequency band of 2 kHz or higher.

The first switch 74 switches a sound outputted from the ear speaker 60 between the information sound processed by the ear reverberation section 72 and the ear emphasis section 73 and the information sound from the navigation device 10. In other words, the ear speaker 60 outputs either an information sound that has been specially processed or an information sound that has not specially processed.

The second ear volume controller 71 adjusts a volume of the information sound from the ear speaker 60. The second ear volume controller 71 is provided after the first switch 74, and adjusts a volume of an information sound selected by the first switch 74, i.e., the information sound processed by the ear reverberation section 72 and the ear emphasis section 73, or the information sound from the navigation device 10. The second ear volume controller 71 outputs a sound signal, which has been adjusted in volume by the second ear volume controller 71, to the second switch 75.

The second switch 75 switches a speaker that outputs the sound signal that has been adjusted in volume by the second ear volume controller 71 between the left ear speaker 60L and the right ear speaker 60R. The second switch 75 allows the information sound to be output only from the left ear speaker 60L, for example.

The main speaker 50 receives an input of a signal based on the audio sound controlled by the audio sound controller 31. Thus, the main speaker 50 outputs the audio sound controlled by the audio sound controller 31.

The ear speaker 60 receives an input of a signal based on a synthesized sound obtained by superimposition of the audio sound controlled by the audio sound controller 31 and the information sound controlled by the information sound controller 70. As a result, the ear speaker 60 outputs the synthesized sound controlled by the audio sound controller 31 and the information sound controller 70.

Next, control of the information sound controller 70 will be described in more detail with reference to FIGS. 2 and 3. The information sound controller 70 is a sound controller that emphasizes the information sound more when the information sound indicates a high degree of necessity for the driver to take action against the information sound than when the information sound indicates a low degree of the necessity. Then, the information sound controller 70 outputs the information sound.

The degree of the necessity for the driver to take action is also called a degree of immediate-response necessity. The information sound with a high degree of immediate-response necessity is, for example, a sound indicating information that requires immediate action, more specifically, "Go to the left. Please turn left here." An information sound with a low degree of immediate-response necessity is, for example, a sound that indicates information that does not require immediate action, more specifically, "2 km ahead, go to the left."

Figures 3, 4, 5:
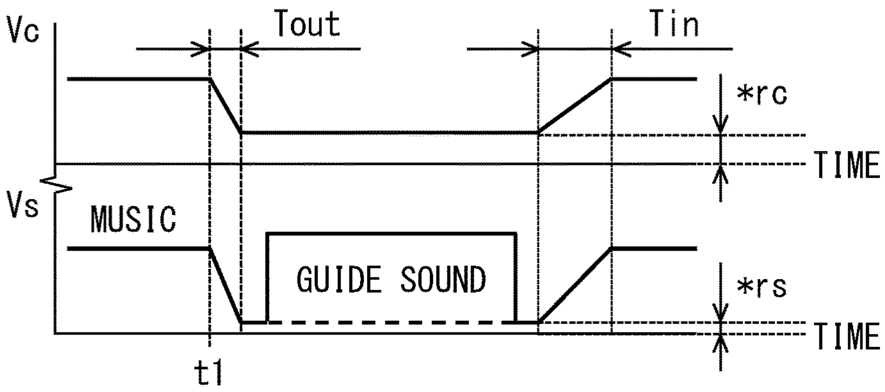
FIG. 3 is a diagram for explaining levels of immediate-response necessity.
FIG. 4 is a diagram for explaining volume adjustment.
FIG. 5 is a diagram for explaining emphasis of high frequency component.

The degree of immediate-response necessity is divided into four levels in the present embodiment, as shown in FIG. 3. The fourth level is a level with the highest degree of immediate-response necessity, and the first level is a level with the lowest degree of immediate-response necessity. The number of levels is arbitrary as long as the number of levels is two or more, and the number of levels may be five or more. At the fourth level, it is necessary to start taking action immediately after the information sound is output. At the third level, an allowance period of time during which taking action is required is several seconds from the output of the information sound. At the second level, the allowance period of time is several tens of seconds from the output of the information sound. At the first level, the allowance period of time is several minutes or more from the output of the information sound. In other words, the length of the allowance period of time is one of indicators for level classification.

For example, the fourth level is a warning sound for a collision warning, and the third level is the guide sound such as "Go to the left. Please turn left here." For example, the second level is the guide sound such as "2 km ahead, go to the left", and the first level is the guide sound such as "5 km or more, follow the road".

Then, the information sound controller 70 emphasizes the information sound such that a length of reverberation added to the information sound is smaller when the degree of immediate-response necessity is high than when the degree of immediate-response necessity is low. This is because, when the length of reverberation is large, a degree of urgency in listening becomes small.

The information sound controller 70 controls to increase a degree of emphasizing a high frequency component of the information sound to which the reverberation has been added. This is to prevent hearing difficulty due to the reverberation addition process.

Further, the information sound controller 70 controls to emphasize the information sound outputted from the ear speaker 60 such that a volume from the main speaker 50 is smaller when the degree of immediate-response necessity is high than when the degree of immediate-response necessity is low. This is to make it easier to hear by increasing the volume of the information sound relatively.

Next, a specific information sound emphasis process will be described. As shown in FIG. 4, when the information sound is output, a volume Vc of the audio sound from the main speaker 50 and a volume Vs of the information sound from the ear speaker 60 are adjusted such that the volume Vc is small and the volume Vs is emphasized to be large. More specifically, when the information sound is output from the ear speaker 60 during outputting music from the main speaker 50 and the ear speaker 60, the volume of the audio sound, that is, a voltage applied to the main speaker 50 is reduced.

That is, the volume Vc of the main speaker 50 fades down to a volume, which is obtained by multiplying Vc by rc, over a timeout time Tout [s]. The volume Vs of the ear speaker 60 fades down to a volume, which is obtained by multiplying Vs by rs, over the timeout time Tout [s]. Then, the information sound is output from the ear speaker 60. After the information sound is output, the volume of the main speaker 50 and the ear speaker 60 is restored to a previous volume over the time-in time Tin [s]. Here, "rc" and "rs" are coefficients that adjust the volume.

As shown in FIG. 3, the timeout time Tout, coefficients rc and rs are changed according to the level of urgency of the information sound output from the ear speaker 60 and the level of the degree of the necessity for the driver to take action immediately. At the fourth level, since Tout is equal to zero, that is, the volume of the audio sound suddenly decreases and the output of the information sound starts, so that a high degree of urgency can be intuitively recognized. In addition, since rc and rs are equal to zero, that is, the audio sounds from both the main speaker 50 and the ear speaker 60 are completely muted, thereby further emphasizing the high degree of urgency.

At the third level, since Tout is equal to 0.2 [s], it is intuitively recognized that this is an information sound that should be dealt with immediately, although it is not an emergency. Since rs is equal to zero, that is, the audio sound from the ear speaker 60 is completely muted, the information sound can be very easily heard by the driver. On the other hand, rc is equal to 0.5, that is, the volume of the main speaker 50 is reduced 0.5 times in signal amplitude. This allows passengers, especially a front seat passenger, to continue listening to the audio sound with little discomfort, and the driver can intuitively understand that a situation is not an emergency situation in which the audio sound must be muted. Also, when the audio sound of the main speaker 50 is reduced with 0.5 of rc and the audio sound of the ear speaker 60 is completely muted with zero of rs, the driver can hear the information sound very well.

At the second level, since the audio sound slowly fades down over Tout from 0.5 to 1.0 [s], the driver can intuitively understand that the level of urgency of the information sound is medium.

At the first level, the audio sound fades down very slowly over Tout from 1.0 to 2.0 [s]. As a result, the driver can intuitively feel that the information sound is completely non-urgent. In addition, since rc is equal to 0.5 as in the second and third levels, and rs is equal to 0.1, the ear speaker 60 is not completely muted, and keeps a little volume of the audio sound. As a result, the non-emergency of the information sound is emphasized, and the driver can listen to the information sound without feeling uncomfortable due to interruption of the audio sound. If rs is about 0.1, an ease of hearing the information sound is not impaired.

In restoration, i.e., fading-up of the volume of the audio sound at the time of outputting the information sound, the time-in time Tin [s] is taken to restore the information sound to the volume before the outputting of the information sound. If it is intended to avoid hindering of the driver's understanding of the contents of the information sound, at the above-mentioned first to fourth levels, the audio sound may fade up slowly over a period of time of, for example, 1.0 to 2.0 [s].

The ear reverberation section 72 of the information sound controller 70 changes a length of reverberation according to the level of the degree of immediate-response necessity. For example, the reverberation length is set at 0.2 [s] at the first level, 0.1 [s] at the second level, and 0 [s] at the third level. The reverberation length is shortened as the level increases.

Since the ear reverberation section 72 is given a type of the information sound and the level of the degree of immediate-response necessity from the navigation device 10, the ear reverberation section 72 sets the reverberation length according to the level, and performs the reverberation addition process. Also, the reverberation length may be designated by a user from the setting screen of the navigation device 10.

Thus, when the audio sound is output from the ear speaker 60, the information sound is emphasized by fading-down or muting the volume of the audio sound from the ear speaker 60 in accordance with the output of the information sound. Further, when the audio sound is not output from the main speaker 50 and the information sound is output from the ear speaker 60, there is no need to control the output from the main speaker 50. Also, even when the audio sound is output from the main speaker 50 but the audio sound is not output from the ear speaker 60, the output of the audio sound from the main speaker 50 is similarly controlled.

Further, the ear emphasis section 73 of the information sound controller 70 changes characteristics of emphasis of high frequency component according to the level. The characteristics of emphasis of high frequency component are, for example, changed by adjusting a lower limit fcg [KHz] of a frequency to be emphasized and a volume rg [dB] to be emphasized. Therefore, the ear emphasis section 73 controls the output sound to increase the volume rg at frequencies equal to or higher than the lower limit fcg.

The ear emphasis section 73 changes the characteristic of emphasis of high frequency component according to, for example, the level of the degree of immediate-response necessity. For example, at the first level, the volume rg is emphasized by 6 dB in a high frequency band with a lower limit fcg of 2 kHz. At the second level, the volume rg is emphasized by 3 dB in a high frequency band with a lower limit fcg of 4 kHz. Also, at the third level, the emphasis process is not performed. As mentioned above, the lower the level of the degree of immediate-response necessity, the longer the reverberation. As the length of the reverberation increase, the information sound tends to become more difficult to hear. Therefore, by the emphasizing process in this way, the ease of hearing can be kept constant regardless of the length of the reverberation.

As described above, in the present embodiment, at the third and fourth levels of the degree of immediate-response necessity, the ear reverberation section 72 does not perform the reverberation addition process and the ear emphasis section 73 does not perform the emphasis process of emphasizing a high frequency component. Therefore, at the third and fourth levels of the degree of immediate-response necessity, the first switch 74 is switched to select an input of the information sound directly from the navigation device 10 without selecting an input from the ear reverberation section 72 and the ear emphasis section 73. As a result, the information sound from the navigation device 10 is output from the ear speaker 60 without special processes.

The characteristics of the ear emphasis section 73 may be variable according to noise levels in the vehicle compartment. For example, as shown in FIG. 5, the noise levels may be estimated from information on a traveling speed, and the characteristic of emphasis of high frequency component may be changed. As the noise in the vehicle compartment increases, the information sound tends to become more difficult to hear. Therefore, by the emphasizing process in this way according to the noise levels, the ease of hearing can be kept constant regardless of a volume of the noise. Also, the noise levels may be estimated using not only the traveling speed but also a speed of a blower fan of a vehicle air conditioner and an open/close state of windows of the vehicle.

Since the ear emphasis section 73 is given a type of the information sound and the level of the degree of the immediate-response necessity from the navigation device 10, the ear emphasis section 73 sets the characteristics of the high frequency emphasis according to the level, and performs the emphasis process. Also, the characteristics of the emphasis process may be designated by a user from the setting screen of the navigation device 10.

The second ear volume controller 71 controls to emphasize the information sound such that a sound pressure of the information sound is higher when the information sound indicates the high degree of the immediate-response necessity than when the information sound indicates the low degree of the immediate-response necessity. By simply increasing the sound pressure, that is, by increasing the sound volume, the driver can be made to recognize that the degree of the immediate-response necessity is high.

Furthermore, the information sound controller 70 controls to emphasize the guide sound such that a degree of emphasizing the guide sound audible to the right ear of the operator is higher than a degree of emphasizing the guide sound audible to the left ear of the operator when the guide sound instructs the operator to make a right turn. Also, the information sound controller 70 controls to emphasize the guide sound such that the degree of emphasizing the guide sound audible to the left ear of the operator is higher than the degree of emphasizing the guide sound audible to the right ear of the operator when the guide sound instructs the operator to make a left turn.

More specifically, the second switch 75 of the information sound controller 70 controls to output the guide sound that instructs a left turn or steering to the left, such as "Go to the left", only from the left ear speaker 60L arranged to be closer to the left ear of the driver. Further, the second switch 75 controls to output the guide sound that instructs a right turn or steering to the right, such as "Go to the right", only from the right ear speaker 60R arranged to be closer to the right ear of the driver. The second switch 75 also controls to output the guide sound that does not instruct steering in the left-right direction from both of ear speakers 60. This allows the driver to intuitively grasp a direction in which the vehicle should travel and the direction in which the vehicle should be steered, with less cognitive load.

As described above, in the in-vehicle system 100 of the present embodiment, since the ear speaker 60 outputs the information sound such that the sound pressure at the position of the ears of the driver is higher than at the other positions, the driver feel such that the ears speaker outputs the information sound in the ears of the driver. When the information sound is output in the driver's ear, the information sound has a stronger psychological effect on the driver than when the information sound is output at a place away from the driver, and the driver can hear more easily the information sound. Also, when the degree of the immediate-response necessity is high, the information sound is emphasized, so that the driver can hear more easily the information sound than when the degree of the immediate-response necessity is low. As a result, the sound output device is capable of outputting the information sound such that the driver can hear more easily the information sound that the degree of the necessity for the driver to take action against is high.

Therefore, in the present embodiment, the information sound controller 70 outputs from the ear speaker 60 when the level of the degree of the immediate-response necessity is high. Since human beings are strongly psychologically affected by utterance near the ear, the driver can intuitively grasp that the degree of the immediate-response necessity is high by output of the information sound that includes a high level of the degree of the immediate-response necessity from the ear speaker 60.

In addition, in the present embodiment, when the information sound is a low level of the degree of the immediate-response necessity, for example "2 km ahead, go to the left," the information sound controller 70 controls to add the reverberation to the original audio signal by a signal process. As a result, the information sound increases an auditory distance, the driver feels that no immediate response is necessary. This allows the driver to intuitively grasp that the degree of the immediate-response necessity is low.

In addition, since the reverberated guide sound may be difficult to hear, the signal process is applied to the emphasis process of emphasizing a high frequency component. Thus, when the reverberation addition process is performed, the ease of hearing can be improved.

Second Embodiment

Next, a second embodiment of the present disclosure is described. In the present embodiment, the main speaker 50 is characterized in that the main speaker 50 outputs both the information sound and the audio sound to the vehicle compartment of the vehicle. In the first embodiment described above, the main speaker 50 dose not output the information sound. The audio sound is different form the information sound related to driving, and is a called normal sound. In the present embodiment, the ear speaker 60 outputs the information sound, and similarly the main speaker 50 outputs the information sound as necessary. As a result, since the information sound is output in the vehicle compartment, passengers other than the driver also can recognize information that includes a high level of the degree of the immediate-response necessity, for example a warning sound.

Also, the main speaker 50 may switch sound to be output according to the level of the degree of the immediate-response necessity and presence or absence of a passenger. For example, the output controller 30 may prohibit output of the information sound from the main speaker 50 when an occupant is on a seat other than the driver's seat, and permit the output of the information sound from the main speaker 50 when an occupant is not on the seat other than the driver's seat. When there is no occupant in a seat other than the driver's seat, the information sound with a low level of the degree of the immediate-response necessity, for example, the first level of the degree of the immediate-response necessity, is output only from the main speaker 50 without being output from the ear speaker 60.

The presence or absence of an occupant can be detected by an occupant sensor. The occupant sensor is a sensor for detecting information related to an occupant. The occupant sensor includes door courtesy switches and seating sensors. The courtesy switches detect opening and closing of the doors of the vehicle. The seating sensor detects a seating position of the passenger.

When there is a passenger other than the driver, for example, the information of the first to third levels of the degree of the immediate-response necessity may be output only from the ear speaker 60, and only the information of the fourth level of the degree of the immediate-response necessity may be output from the ear speaker 60 and the main speaker 50. Further, the guide sound may not be output from the main speaker 50, and the sounds of the level of the degree of the immediate-response necessity other than the guide sound, for example, only the warning sound may be output from the audio speaker. As a result, necessary information for the driver and fellow passengers can be output at appropriate timing.

Furthermore, regardless of the presence or absence of the passenger, the information sound controller 70 may emphasize the information sound by controlling the audio sound outputted from at least one of the main speaker 50 and the ear speaker 60. More specifically, the information sound controller 70 may control to emphasize the information sound outputted from the ear speaker 60 such that a volume of the audio sound from the main speaker 50 is smaller when the degree of the immediate-response necessity is high than when the degree of the immediate-response necessity is low. This is capable of making it easier to hear by increasing the volume of the information sound relatively.

Further, the information sound controller 70 may control to emphasize the information sound outputted from the ear speaker 60 such that a time taken for fading-down of the audio sound to a certain volume is shorter when the degree of the immediate-response necessity is high than when the degree of the immediate-response necessity is low. That is, when the degree of the immediate-response necessity is high, the timeout time Tout [s] of the volume of the main speaker 50 and the ear speaker 60 is shortened. As a result, the volume of the audio sound is reduced in a shorter time, so that the information sound is relatively emphasized. Also, the volume of the audio sound after fading down may not be muted, but may have a certain volume more than zero. Alternatively, the time taken for fading-down of the audio sound to zero volume may be simply shortened such that the volume of the audio sound has the certain volume more than zero.

Other Embodiments

The present disclosure is not limited to the preferred embodiments of the present disclosure described above. Various modifications may be made without departing from the subject matters of the present disclosure.

It should be understood that the configurations described in the above-described embodiments are example configurations, and the present disclosure is not limited to the foregoing descriptions. The scope of the present disclosure encompasses claims and various modifications of claims within equivalents thereof.

In the above-described first embodiment, the information sound is output even when the level of the degree of the immediate-response necessity is low. However, when the level of the degree of the immediate-response necessity is lower than a standard level, the information sound may be not output from the ear speaker 60. In other words, the information sound may be emphasized when the level of the degree of the immediate-response necessity is higher than the standard level by that the information sound is output when the level of the degree of the immediate-response necessity is higher than the standard level, and by that the information sound is muted when it is lower than the standard level. Therefore, the level of the degree of the immediate-response necessity is divided into at least two levels, and when the level of the degree of the immediate-response necessity is lower, the information sound is muted, the volume is lowered, or the reverberation is added so that it is controlled not to be emphasized than the high level.

In the above-described first embodiment, the sound output device is realized by the in-vehicle system 100, and sound output device is not limited to a system installed in a vehicle. The sound output device may be installed in other mobile devices, such as a motorcycle, a heavy machinery, an airplane, a ship, and the like, which is operated by a driver.

In addition, in the above-described first embodiment, the ear speaker 60 is fixedly arranged to be closer to the ear, but the configuration is not limited to this, and a portable speaker may be used. For example, headphones that are worn directly on the ear, a neck-type speaker that is worn around a neck, an open-ear type speaker that is placed near the ear, or the like may be used. In the case of such a portable speaker, the output controller 30 may also be integrated with the portable speaker. When the portable speaker is used in the vehicle, the output controller 30 may communicate with the vehicle wirelessly or by wire to acquire the audio sound and the information sound. In the case of a motorcycle, a portable speaker may be built in a helmet. Further, in the case of a portable speaker wirelessly connected to a mobile terminal such as a smartphone, the mobile terminal may function as the output controller 30, and the navigation device 10 may be realized by an application of the mobile terminal. As a result, the same functions as the in-vehicle system 100 of the above-described first embodiment can be realized by the mobile terminal and the portable speaker even while moving on foot.

Also, the ear speaker 60 may have a configuration that enhances the sound pressure close to the ear using a stereophonic sound. In other words, even if there is no ear speaker 60 close to the ear, the same actions and effects as those of the above-described first embodiment can be achieved as long as a configuration outputs sound as if a speaker is arranged to be closer to the ear.

In the above-described first embodiment, the functions realized by the output controller 30 may be realized by hardware and software different from those described above or by a combination of the hardware and the software. The output controller 30 may communicate with, for example, another control device, and the other control device may execute a part or all of the process. When the output controller 30 is realized by an electronic circuit, the output controller 30 may be realized by an analog circuit or a digital circuit including a large number of logic circuits.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A sound output device comprising:

an ear speaker configured to output an information sound such that sound pressure of the information sound at a position of an ear of an operator is higher than sound pressure at positions other than the position of the ear; and a processor configured to:

acquire data of the information sound providing the operator with information; and control the ear speaker to emphasize the information sound more when the information sound indicates a high degree of necessity for the operator to take action against the information sound than when the information sound indicates a low degree of the necessity;

control the ear speaker to emphasize the information sound such that a length of reverberation added to the information sound is smaller when the information sound indicates the high degree of the necessity than when the information sound indicates the low degree of the necessity; and control the ear speaker to decrease a degree of emphasizing a high frequency component of the information sound to which the reverberation has been added, wherein the processor is configured to increase the degree of emphasizing the high frequency component by increasing a volume of the high frequency component at frequencies equal to or higher than a lower limit of the high frequency component.

2. The sound output device according to claim 1, wherein the processor is configured to control the ear speaker to emphasize the information sound such that a sound pressure of the information sound is higher when the information sound indicates the high degree of the necessity than when the information sound indicates the low degree of the necessity.

3. The sound output device according to claim 1, wherein the information sound includes a guide sound guiding a travel direction of the operator, and the processor is configured to control the ear speaker to emphasize the guide sound such that:

a degree of emphasizing the guide sound audible to a right ear of the operator is higher than a degree of emphasizing the guide sound audible to a left ear of the operator when the guide sound instructs the operator to make a right turn; and the degree of emphasizing the guide sound audible to the left ear of the operator is higher than the degree of emphasizing the guide sound audible to the right ear of the operator when the guide sound instructs the operator to make a left turn.

4. The sound output device according to claim 1, wherein the ear speaker is arranged in a headrest of a driver's seat of a vehicle or around the headrest.

5. The sound output device according to claim 4, further comprising an audio speaker configured to output an audio sound in a vehicle compartment, wherein the information sound provides the operator with information related to a driving operation of the vehicle, the audio sound is different from the information sound, and the processor is configured to control the audio speaker, the ear speaker or both the audio speaker and the ear speaker to emphasize the information sound outputted from the ear speaker such that a volume of an audio sound is smaller when the information sound indicates the high degree of the necessity than when the information sound indicates the low degree of the necessity.

6. The sound output device according to claim 5, wherein the processor is configured to prohibit output of the information sound from the audio speaker when an occupant is on a seat other than the driver's seat, and the processor is configured to permit the output of the information sound from the audio speaker when an occupant is not on the seat other than the driver's seat.

7. The sound output device according to claim 4, further comprising an audio speaker configured to output an audio sound in a vehicle compartment, wherein the information sound provides the operator with information related to a driving operation of the vehicle, the audio sound is different from the information sound, and the processor is configured to control the audio speaker, the ear speaker or both the audio speaker and the ear speaker to emphasize the information sound outputted from the ear speaker such that a time taken for fading-down of an audio sound to a certain volume is shorter when the information sound indicates the high degree of the necessity than when the information sound indicates the low degree of the necessity.

8. The sound output device according to claim 7, wherein the processor is configured to prohibit output of the information sound from the audio speaker when an occupant is on a seat other than the driver's seat, and the processor is configured to permit the output of the information sound from the audio speaker when an occupant is not on the seat other than the driver's seat.

9. The sound output device according to claim 1, wherein the processor is configured to control the ear speaker to decrease a degree of increasing a volume of the high frequency component and to raise the lower limit of the high frequency component such that the volume of the high frequency component is greater and the lower limit is higher when the information sound indicates the high degree of the necessity than when the information sound indicates the low degree of the necessity.

10. A sound output device comprising:

an ear speaker configured to output an information sound such that sound pressure of the information sound at a position of an ear of an operator is higher than sound pressure at positions other than the position of the ear; and a processor configured to:

acquire data of the information sound providing the operator with information; and control the ear speaker to emphasize the information sound more when the information sound indicates a high degree of necessity for the operator to take action against the information sound than when the information sound indicates a low degree of the necessity;

control the ear speaker to emphasize the information sound such that a length of reverberation added to the information sound is smaller when the information sound indicates the high degree of the necessity than when the information sound indicates the low degree of the necessity; and control the ear speaker to decrease a degree of emphasizing a high frequency component of the information sound to which the reverberation has been added, wherein a frequency band of the information sound comprises the high frequency component and a remaining frequency component, and only the high frequency component is emphasized without emphasizing the remaining frequency component.

* * * * *